Figure 1:
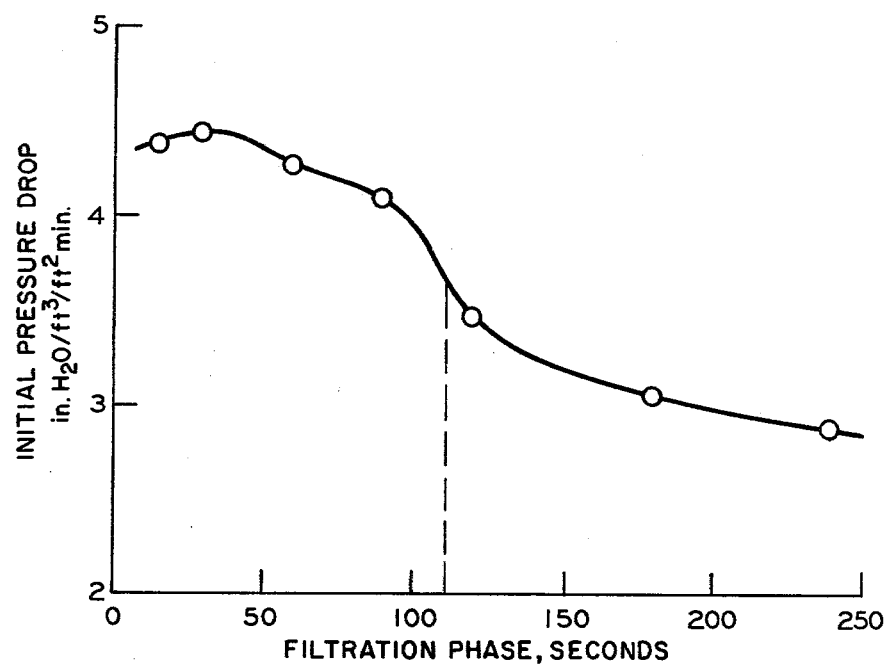

United States Patent [19]

Cheng

[11] 4,191,542
[45] Mar. 4, 1980

[54] FILTERING PROCESS FOR A CARBON BLACK-CONTAINING GAS

[75] Inventor: Paul J. Cheng, Bartlesville, Okla.

[73] Assignee: Phillips Petroleum Company, Bartlesville, Okla.

[21] Appl. No.: 902,656

[22] Filed: May 4, 1978

Related U.S. Application Data

[63] Continuation-in-part of Ser. No. 563,402, Mar. 31, 1975, abandoned.

[51] Int. Cl.² ............................................. B01D 46/04
[52] U.S. Cl. ............................................. 55/96; 55/97; 55/302
[58] Field of Search ................... 55/97, 96, 270; 73/38

[56] References Cited

U.S. PATENT DOCUMENTS

| | | | |
|---|---|---|---|
| 2,805,732 | 9/1957 | Martinez | 55/97 |
| 3,243,940 | 4/1966 | Larson | 55/96 |
| 3,499,315 | 3/1970 | Marino | 73/38 |
| 3,716,971 | 2/1973 | Reinauer | 55/96 |

OTHER PUBLICATIONS

Walling-Ins & Outs of Gas Filter Bags in Chemical Engineering 10/19/70 pp. 162–167.
Chard et al. Anomalous Behavior of Air Filters in Filtration & Separation Nov., Dec., 1973, pp. 701–705.

*Primary Examiner*—Bernard Nozick

[57] ABSTRACT

A process for filtering carbon black-containing gas wherein an optimum of carbon black recovery is achieved by filtering at least the critical filtration time and up to 50 percent, preferably up to 20 percent, longer than said critical filtration time before backflowing. The critical filtration time is that filtration phase at which the linearly plotted curve of the initial pressure drop versus the filtration phase has an inflection point. Specific formulae are given for a Teflon filter bag and carbon blacks of about 80 to about 130 square meters per gram nitrogen surface area.

6 Claims, 3 Drawing Figures

FILTERING PROCESS FOR A CARBON BLACK-CONTAINING GAS

This application is a continuation-in-part application of copending application having Ser. No. 563,402, filed Mar. 31, 1975, now abandoned.

This invention relates to the art of recovering carbon black from a carbon black-containing gas. More particularly, the invention relates to the recovery of carbon black from the effluent stream of a carbon black reactor.

BACKGROUND OF THE INVENTION

Gas containing carbon black particles, also called smoke, leaving a reactor is quenched, usually with water, and passed through filter bags on which the carbon black is deposited and the gas passes through the filter. The flow of smoke through the filter is then stopped and the accumulated carbon black is recovered from the filter by passing a gas stream in opposite direction to the flow of the carbon black-bearing gas through the filter to release the carbon black from the filter walls. After this step the smoke is again passed through the filter to repeat the cyclic operation. The filtering process is a critical portion of the entire carbon black-producing process. The filter houses are expensive and space-consuming and the cost of the filtering constitutes a considerable amount, sometimes the highest portion, of the overall cost to produce carbon black. It is thus highly desirable to optimize the filtration efficiency.

THE INVENTION

It is one object of this invention to provide a process for filtering carbon black from carbon black-containing gases.

A further object of this invention consists in the provision of a process with optimum filtration efficiency.

Still another object of this invention is to provide a carbon black filtering process with a minimum of wear of the carbon black filter bag.

Figure 2:
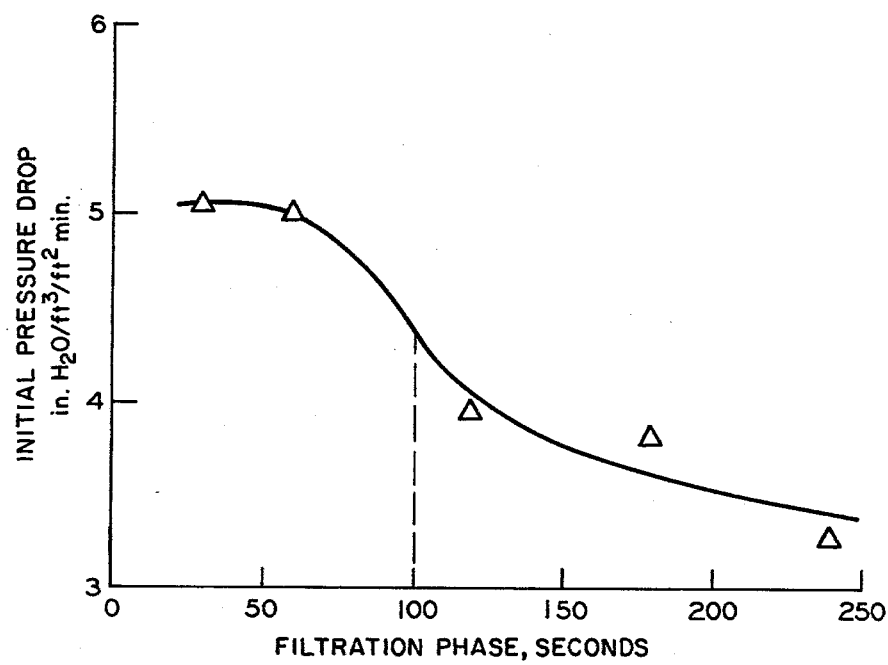
Figure 3:
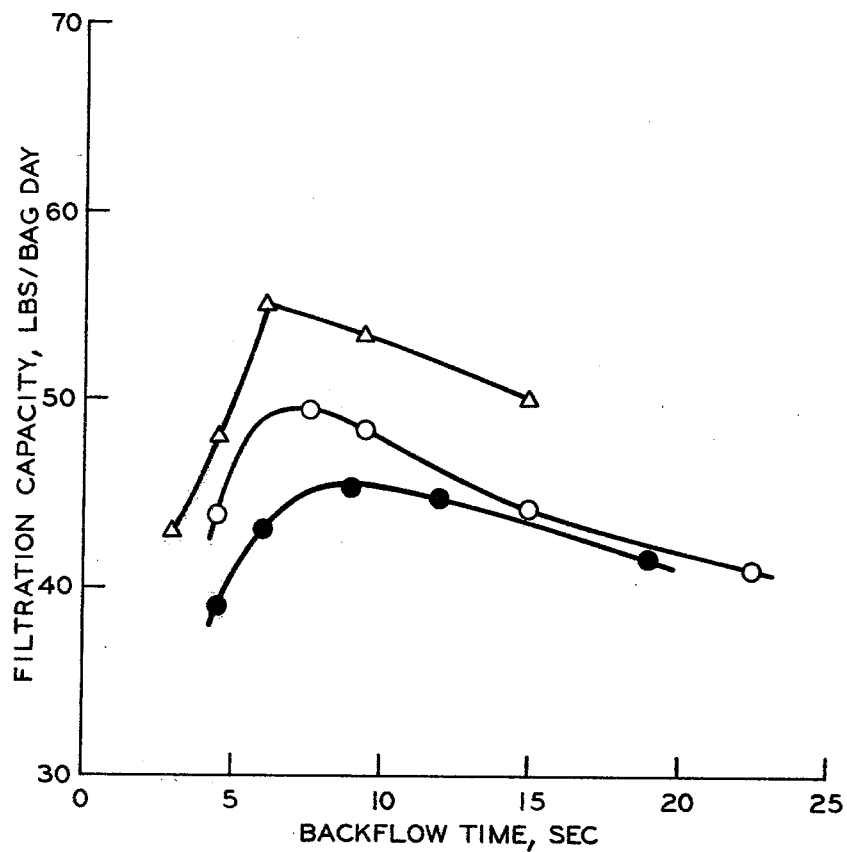

These and other objects, advantages, aspects, and embodiments of this invention will become apparent to those skilled in the art from the following detailed description of the invention, the appended claims, and the drawings, of which FIGS. 1 and 2 are graphs of the function of the initial pressure drop versus the filtration phase for two different carbon blacks, and FIG. 3 is a graph of the filtration capacity versus the backflow time for three different operating conditions.

In accordance with the invention set forth in said copending application, I have found that the quantity of carbon black recovered by filtering a carbon black-containing gas at an otherwise unchanged set of operating conditions can be brought to an optimum by passing the carbon black-containing gas through the filter for a filtration phase which is between one and about one and one-half times the critical filtration time.

In accordance with this invention, the critical filtration time (cf) can be represented by the general empirical formula $$(cf) = \frac{1}{(cs)(vf)} \left( \frac{A}{S} + B(cs) \right) \quad (1)$$

wherein cf is critical filtration time in seconds; vf is actual (a) gas flow in cubic ft/square foot of bag surface/minute; S is the surface area (N₂SA) of the carbon black in m²/gm; cs is smoke concentration, pounds of carbon black/actual (a) cubic foot of gas; A is an empirically determined constant, determined from data for each specific type of filter bag, e.g., polytetrafluorethylene, orlon, glass fiber, weave of bag, etc.; for polytetrafluoroethylene, the value of A is 28.6; B is an empirically determined constant, determined from data for each specific type of filter bag, as was defined for A, the value of B being 0.9 for polytetrafluoroethylene; and (a) is actual cubic feet at the filter temperature and pressure.

In accordance with an embodiment of the invention, the critical filtration time (cf), in seconds, using polytetrafluoroethylene bags can be represented by the general formula $$(cf) = \frac{1}{(cs)(vf)} \left( \frac{28.6}{S} + 0.9(cs) \right) \quad (2)$$

wherein cs, vf, and S have the values defined above.

Broadly, according to the invention, a process is provided for recovering carbon black from a carbon black-containing gas comprising passing the carbon black-containing gas through a filter for a filtration phase (fp) which is at least as long as the critical filtration time (cf) and up to 50 percent longer; the critical filtration time (cf) being defined as the filtration phase (fp) at which the linearly plotted curve of the initial pressure drop (ΔP) versus the corresponding filtration phase (fp) has an inflection point, the linearly plotted curve being represented by ΔP=f(fp), equation 3, plotted in plane Cartesian coordinates, wherein the filtration phase (fp) is along the abscissa, or X-axis, and the corresponding initial pressure drop (ΔP) is along the ordinate, or Y-axis, the inflection point being at that value of (fp), the filtration phase, wherein in equation 4, $$\left( \frac{\partial^2 \Delta P}{\partial (fp)^2} \right)_{P,T,S,Cs,Vf,Vr,Cb} = 0 \quad (4)$$

and at the zero value in equation 4, (cf)=(fp), and further wherein, in equation 4, when (fp) is slightly larger or slightly smaller than the now determined value (cf), the value of equation 4 changes sign (e.g., − to +, or + to −); stopping the flow of carbon black-containing smoke after the critical filtration time (cf) has been reached and up to 50 percent longer; passing a backflow gas in an opposite direction from the flow of the carbon black-containing gas through the filter for a backflow phase (cb) to remove carbon black from the filter, and transferring the carbon black to a collection point; stopping the flow of backflow gas, and repeating said phases; wherein P is the actual pressure of the carbon black-containing gas in the filter during the filtration phase (usually in inches of water); T is the actual temperature of the carbon black-containing gas in the filter during the filtration phase; S is the nitrogen surface area of the carbon black (m²/gm); Cs is smoke concentration, usually in pounds of carbon black per actual cubic foot of gas (at P and T); Vf is actual gas flow rate (at P and T) of the carbon black-containing gas in cubic feet of gas per square foot of filter surface per minute; Cb is the backflow phase, in seconds, Vr is actual volume flow rate of backflow gas in cubic feet of gas per square foot of filter surface per minute, at the temperature and pressure of the backflow gas; and wherein $$Cb = f\left(\frac{K}{Vr}\right) \quad (5);$$

ΔP is the initial pressure drop, after the backflow phase, and is the difference in the actual pressures upstream and downstream of the filter at the beginning of a filtration phase per unit of filtration rate, usually given in inches of water per cubic feet of carbon black-containing gas per square foot of filter surface per minute; and (fp) is the filtration phase of flow of carbon black-containing gas through the filter between successive backflow phases in seconds.

In one embodiment of my invention the filtration phase and the backflow phase in the case of a polytetrafluoroethylene filter are related to other process parameters. In accordance with this embodiment, the filtration process is carried out as a cyclic operation by passing the carbon black-containing gas for a filtration phase through a polytetrafluoroethylene filter which is about one to one and one-half times the critical filtration time, being defined by the formula:

$$cf = \frac{1}{(cs)(vf)} \cdot \left(\frac{13.5}{S^{\frac{1}{2}}} - 28\, cs^{\frac{1}{2}}\right) \quad (6)$$

wherein cf is the critical filtration time in seconds, cs is the smoke concentration, vf is the filtration rate, S is the surface area, all as defined in the forthcoming, definitions. Formula (3) is based on data points obtained in the specific working examples herein and, accordingly, defines the critical filtration time for a narrower range of carbon black concentration (cs) than defined in Formula (2).

In accordance with another embodiment of this invention, the backflow phase giving optimum results is to be not less than the minimum backflow phase which is defined by the formula $$cb = 4.5/vr \quad (7)$$

wherein cb is the minimum backflow phase in seconds and vr is the backflow rate as defined in the definitions.

In actual operation, as one filters any solid from any gas through any filter, a layer of material builds up on this filter. When one "backflows" the filter to recover the collected solid, some of the solid is removed. A ΔP across the filter after this backflow and before the next filter cycle is indicative of the amount of solids recovered from the filter. A high initial ΔP means a considerable amount of solids is left on the filter. A small initial ΔP means a lesser amount of solids is left on the filter, or that more solids was removed from the filter and recovered during this backflow recovery cycle.

It is presently most preferred when using a polytetrafluoroethylene filter bag to operate in accordance with the last two embodiments given in connection with equations (6) and (7) combined. Thereby both the optimum filtration phase and the optimum backflow phase together result in the highest filtration efficiency.

DEFINITIONS

The following definitions of terms employed in the description of the various embodiments of this invention are provided.

Filtration phase (fp)—The time of flow of the carbon black-containing gas through the filter between two subsequent steps of emptying the filter, or it is the filtration time after the last backflow was switched off and before the next backflow is switched on. The filtration phase is usually measured in seconds.

Critical filtration time (cf)—The filtration phase at which the downwardly sloping curve of the initial pressure drop versus the filtration phase has an inflection point. This sharp drop down can also be defined mathmatically as that filtration phase at which the second derivative of the function of the initial pressure drop having the filtration phase as a variable is zero; thus cf is the solution to the equation $$\left(\frac{d^2\,(\text{initial pressure drop})}{dfp^2}\right)_{fp\,=\,cf} = 0$$

The critical filtration time is also usually measured in seconds. Inflection point is that x value in the second derivative where $y''(d^2y/dx^2)$ is zero. That is, to either side of x value of the inflection point, $y''$ is either + or − (concave upward or concave downward, respectively), and where $y''$ is zero the inflection point is at that x value.

Backflow phase: The time of flow of backflow gas through the filter during one cycle after the last flow of carbon black-containing gas and before the next flow of carbon black-containing gas through the filter, usually measured in seconds.

Smoke concentration (cs)—The number of pounds of carbon black contained in one cubic foot of smoke or carbon black-containing gas. This smoke concentration is determined by measuring the carbon content in the "clean" gas which is freed of the carbon black. This gas is mainly present as $H_2$, $H_2O$, $CO$, $CO_2$, and $N_2$. The content of these compounds is measured by standard procedures well known in the art. The quantity of carbon entering the carbon black reactor in the form of fuel and oil is also known. Thus, the difference of "carbon in" versus "carbon out" is the quantity of carbon present as carbon black. From the number of pounds of carbon black in each cubic foot of total gas this value is corrected to the filter temperature and this value finally is the smoke concentration, cs.

Filtration rate (vf)—The flow rate of carbon black-containing gas through the unit area of the filter. The filtration rate is measured in $ft^3/ft^2$ min. This value is obtained by measuring the total quantity of clean gas flowing out of the filter per minute and correcting this value to the temperature of the filter. This velocity in cubic feet per minute is then divided by the total bag area in square feet which number is the filtration rate.

Backflow rate (vr)—The volume flow rate of backflow gas through the unit area of the filter. The backflow rate is measured in $ft^3/ft^2$ min.

Surface area (S)—The surface area of a carbon black produced which is measured in accordance with ASTM D 3037-71T Method A.

Initial pressure drop [dp(i)]—The difference in pressures upstream and downstream of the filter at the beginning of a filtration phase per unit filtration rate. It is usually given in in. $H_2O/ft^3/ft^2$ min. This pressure drop is a measure for how "clean" the filter was left after the backflow. A high initial pressure drop (at a given smoke composition and volume filtration rate) indicates a high quantity of carbon black residues remaining on the filter from the previous cycle, a low initial pressure drop (for the same set of parameters) indicates a good removal of the carbon black cake. The pressure drop can be measured in any kind of pressure measuring unit.

Filtration capacity—This is the quantity of carbon black in pounds recovered per bag and day under a given set of operating conditions.

The invention will be more fully understood from the following specific examples.

EXAMPLE I

A carbon black-containing gas or smoke is passed through a filter bag made from a duPont XT-0954 fabric of polytetrafluoroethylene which, after installation, had been treated until the bag dimensions had stabilized. While the smoke passes through the filter bag, the carbon black is deposited on the filter surface whereas clean gas moves on through a pipe. The quantity of clean gas leaving the filter is measured in an orifice meter to determine the filtration rate. Except for the first few runs the bag was operated at 4 to 6 pounds bag tension.

The pressure drop across the filter bag is measured by measuring the pressures at a location just upstream of the bag and just downstream of the bag.

The carbon black had a surface area of about 80 square meters per gram and the smoke has a smoke concentration of 0.00167 pound carbon black per cubic foot. The temperature of the smoke entering the filter system was about 430° F.

Several runs of filtration were carried out. Each run comprised at least 10 cycles of filtration and backflow. For short filtration phases the number of cycles was about 50–100. For each run the length of the filtration phase was the same and the length of the filtration phase was changed from run to run. Thus, for the first run the filtration phase was 15 seconds. For the next run the filtration phase was 30 seconds and so forth. At the end of each filtration phase nitrogen of 350° F. was backflowed in a direction opposite to the flow of the carbon black-containing gas through the filter after the smoke inlet was closed. The backflow rate for every cycle in all the runs was 1.5 $ft^3/ft^2$ min., and the backflow phase for all of the cycles in each and every run lasted 4.5 seconds.

At the end of the backflow phase the backflow gas was shut off and the smoke flow was turned on again. Right at the beginning of the smoke flow the pressure drop across the filter bag was measured. The smoke flow was adjusted so that the filtration rate for all cycles and all runs was about 2.0 $ft^3/ft^2$ min. The initial pressure drop directly indicates how "clean" the filter was after the backflow phase.

The results of these runs are shown in the following table. Each value for the pressure drop is the arithmetic average of the values measured for each cycle within one run.

TABLE I

Initial Pressure Drop Versus Filtration Phase at a Backflow Rate of 1.5 $ft.^3/ft.^2$ min. and a Backflow phase of 4.5 sec.

| Filtration Phase (sec) | Initial Pressure drop* |
|---|---|
| 15 | 4.36 |
| 30 | 4.43 |
| 60 | 4.25 |
| 90 | 4.12 |
| 120 | 3.46 |
| 180 | 3.07 |
| 240 | 2.86 |

*Inch $H_2O$ per unit filtration rate $ft^3/ft^2$ min.

This relationship between the filtration phase and the initial pressure drop is also shown as a curve in FIG. 1. It can be seen that the initial pressure drop at a filtration phase of about 110 seconds has an inflection point. This filtration phase is, therefore, called the critical filtration time. This sharp decline indicates that the removal of carbon black from the filter is drastically improved at this specific critical filtration time.

In Table I, seven runs were reported and FIG. 1 is the plot of the seven runs, plotting filtration phase on the abscissa and initial pressure drop on the ordinate. Each of the seven runs had at least ten filtrations and ten backflows. For example, the first run at 15 seconds filtration phase had at least 50 tests: (50 filtration phases of 15 seconds, each, each followed by a backflow phase of 4.5 seconds). After each complete 15-second filtration and its 4.5-second backflow, the ΔP across the bag was measured. The figure 4.36 is the arithmetic average of at least 50 runs.

Altogether, in seven runs, at least 150 individual tests (filter, then backflow) were run to obtain data for these seven runs.

Thus, for a given set of process parameters the process of filtration should be carried out at a filtration phase which is at least as long as this critical filtration time or up to 50 percent longer than that time. It is presently preferred to operate at a filtration phase which is about 1.1 times the critical filtration time.

EXAMPLE II

Example I was repeated with a different carbon black. Whereas the carbon black produced in Example I had a surface area of about 80 square meters per gram, the carbon black in this example had a surface area of 130 square meters per gram. The smoke had a smoke concentration of 0.0012 pound per cubic foot. The backflow rate for every cycle in all these runs was also 1.5 $ft^3/ft^2$ min. and the backflow phase for all of the cycles in each run lasted 4.5 seconds. The smoke flow was adjusted so that the average filtration rate for all cycles and all runs was about 1.8 $ft^3/ft^2$ min. The results of the runs are shown in the following Table 2.

TABLE 2

Initial Pressure Drop Versus Filtration Phase at a Backflow Rate of 1.5 $ft^3/ft^2$ min. and a Backflow Phase of 4.5 seconds

| Filtration Phase (sec) | Pressure Drop* |
|---|---|
| 30 | 5.05 |
| 60 | 5.03 |
| 120 | 3.93 |
| 180 | 3.81 |

TABLE 2-continued

Initial Pressure Drop Versus Filtration
Phase at a Backflow Rate of 1.5 ft³/ft²
min. and a Backflow Phase of 4.5 seconds

| Filtration Phase (sec) | Pressure Drop* |
|---|---|
| 240 | 3.26 |

*Inch H₂O per unit filtration rate ft³/ft² min.

The results of this table are graphically shown as a curve in FIG. 2. Again, it can be seen that the initial pressure drop sharply declines. The critical filtration time is about 100 seconds.

From Examples I and II the following relationship between the smoke concentration cs, the surface area S, and the critical filtration time cf can be seen.

TABLE 3

| cs lbs/ft³ | 0.00167 | 0.0012 |
|---|---|---|
| S m²/g | 80 | 130 |
| cf (sec) | 110 | 100 |

These results can be expressed by the empirical formula which is based on approximate functional relationships of the variables:

$$cf = \frac{1}{(cs)(vf)} \cdot \left( \frac{13.5}{S^{\frac{1}{2}}} - 28\, cs^{\frac{1}{2}} \right)$$

cf is the critical filtration time in seconds, cs is the smoke concentration in pounds of carbon black per cubic foot of smoke at filter temperature, S is the surface area in square meters per gram measured in accordance with ASTM D 3037-71T Method A. This relationship is believed to be correct also for carbon black with a surface area outside of the range of 80 to 130 square meters per gram.

EXAMPLE III

The operation of Example II was essentially repeated. However, this time the filtration phase of 120 seconds was the same for all the cycles in every run. The backflow rate in ft³/ft² min. was 0.5 for the first series of runs, for the second series 1.0, and for the third series 1.5. For each of these backflow rates, five runs were carried out at different backflow phases as shown in the following table. Each of these runs encompasses, of course, several cycles of filtration and backflow. The regular number of cycles of filtration and backflow per run was 15.

The quantities of carbon black recovered were measured and were calculated as pounds of carbon black per bag and per day for each of these runs mentioned. The results are shown in the following Table 4.

TABLE 4

Filtration Capacity in lbs. of Carbon Black per Bag per Day

| Backflow Time (sec.) | 4.5 | 6 | 9 | 12 | 19 |
|---|---|---|---|---|---|
| Filtration Capacity at 0.5 ft³/ft² min backflow rate | 39 | 43 | 45.3 | 44.8 | 41.5 |
| Backflow Time (sec.) | 4.5 | 7.5 | 9.5 | 15 | 22.5 |
| Filtration Capacity at 1.0 ft³/ft² min backflow rate | 43.8 | 49 | 47.5 | 44.2 | 41 |
| Backflow Time (sec.) | 3 | 4.5 | 6 | 9.5 | 15 |
| Filtration Capacity at 1.5 ft³/ft² min backflow rate | 43 | 48 | 55 | 53.5 | 50 |

The results of these three series of runs are also shown as three curves in FIG. 3. The optimum backflow time for the different backflow rate is shown in the following Table 5.

TABLE 5

| Backflow Rate ft³/ft² min. | 0.5 | 1.0 | 1.5 |
|---|---|---|---|
| Optimum Backflow Time (sec.) | 9 | 7.5 | 6 |

The results of this table show that a relationship exists inversely relating the optimum backflow phase with the backflow rate. Empirically this result can be expressed by the formula for a minimum backflow phase:

$$cb = 4.5/vr$$

wherein cb is the minimum backflow phase in seconds and vr is the backflow rat in ft³/ft² min. Comparing this formula to the results shown in Table 5 one can see that the minimum backflow phase and the optimum backflow phase are the same for small backflow rates. In case of longer backflow rates the optimum backflow time is longer than the minimum backflow time. It has been found that the formula given above for the minimum backflow phase for the polytetrafluoroethylene filters is independent of the properties of the carbon black, in other words also applies to carbon blacks with higher and/or lower surface area.

In the preceding examples numerous runs (150 to 200 individual tests) were made using different filtration times, followed by backflow, after which the ΔP across the bag was determined. The two sets of data obtained in Examples I and II are for two different types of black, and each set of data was plotted separately in FIGS. 1 and 2, the times on filtration cycle being plotted on the x-axis and the corresponding ΔP's being on the y-axis. At the inflection point is the critical filtration time (cf).

The specific empirical formula defined herein wherein (cf) is a function of (S) and (cs), at constant temperature and pressure, was developed by standard mathematical procedures, using actual data for values of the constants A and B in this formula.

Reasonable modifications and variations which will be apparent to those skilled in the art can be made in this invention without departing from the spirit and scope thereof.

I claim:

1. A process for recovering carbon black from a carbon black-containing gas comprising:
    passing said carbon black-containing gas through a filter for a filtration phase (fp) which is at least as long as the critical filtration time (cf) and up to 50 percent longer; said critical filtration time (cf) being defined as the filtration phase (fp) at which the linearly plotted curve of the initial pressure drop (ΔP) versus the corresponding filtration phase (fp) has an inflection point, said linearly plotted curve being represented by ΔP=f(fp), plotted in plane Cartesian coordinates, wherein the filtration phase (fp) is along the abscissa, or X-axis, and the corresponding initial pressure drop (ΔP) is along the ordinate, or Y-axis, said inflection point being at that value of (fp), the filtration phase, wherein, in equation 4, $$\left(\frac{\alpha^2 \Delta P}{\alpha (fp)^2}\right)_{P,T,S,Cs,Vf,Vr,Cb} = 0$$

and the zero value in equation 4, (cf)=(fp), and further wherein, in equation 4, when (fp) is slightly larger or slightly smaller than the now determined value (cf), the value of equation 4 changes sign (e.g., − to +, or + to −);

stopping the flow of said carbon black-containing smoke after the critical filtration time (cf) has been reached and up to 50 percent longer;

passing a backflow gas in a direction opposite of the flow of said carbon black-containing gas through said filter for a backflow phase (cb), thus removing carbon black from said filter, and transferring said carbon black to a collection point; stopping the flow of said backflow gas, and repeating said phases; and wherein:

P = actual pressure of said carbon black-containing gas in said filter during said filtration phase (usually in inches of water);

T = actual temperature of said carbon black-containing gas in said filter during said filtration phase;

S = nitrogen surface area of the carbon black, m²/gm;

Cs = smoke concentration usually in pounds of carbon black per actual cubic foot of gas (at P and T);

Vf = actual gas flow rate, at P and T, of said carbon black-containing gas in cubic feet of gas/square foot of filter surface/minute;

Cb = the backflow phase, in seconds;

Vr = actual volume flow rate of backflow gas in cubic feet of gas/square foot of filter surface/minute, at the temperature and pressure of the backflow gas; and wherein:

$$Cb = f\left(\frac{K}{Vr}\right) \quad (5)$$

ΔP = initial pressure drop, after the backflow phase, and is the difference in the actual pressures upstream and downstream of the filter at the beginning of a filtration phase per unit of filtration rate, usually given in inches of water/cubic feet of carbon black-containing gas/square foot of filter surface/minute; and (fp) = filtration phase of flow of carbon black-containing gas through filter between successive backflow phases in seconds.

2. A process for recovering carbon black from a carbon black-containing gas comprising passing said carbon black-containing gas through a filter for a filtration phase which is at least as long as a critical filtration time and up to 50 percent longer, said critical filtration time being defined as the filtration phase at which the linearly plotted curve of the initial filter pressure drop versus the filtration phase has an inflection point and represented by the general formula $$(cf) = \frac{1}{(cs)(vf)}\left(\frac{A}{S} + B(cs)\right)$$

wherein cf is the critical filtration time in seconds; vf is actual (a) gas flow in cubic ft/square foot of bag surface/minute; cs is smoke concentration, lbs. of carbon black/actual (a) cubic foot of gas; A is an empirically determined constant, determined from data for each specific type of filter bag; B is an empirically determined constant, determined from data for each specific type of filter bag as was A; and (a) is the actual cubic feet at the filter temperature and pressure; stopping the flow of said carbon black-containing gas, wherein the filtration phase is the time of flow of carbon black-containing gas through the filter between two subsequent steps of emptying the filter; passing a backflow gas in a direction opposite to the flow of the carbon black-containing gas through said filter for a backflow phase, thus removing carbon black from said filter and transferring said carbon black to a collection point, stopping the flow of backflow gas and repeating said cycles.

3. A process in accordance with claim 2 wherein said stream of backflow gas is backflowed through said filter for a period of time not less than the minimum backflow phase defined by the following formula:

$$cb = 4.5/vr$$

wherein cb is the minimum backflow phase in seconds and vr is the filtration rate in cubic feet per square foot and minute.

4. A process in accordance with claim 2 wherein said carbon black-containing gas is passed for at least the critical filtration time or up to 50 percent longer than that through a polytetrafluoroethylene filter which critical filtration time is defined by the following formula:

$$cf = \frac{1}{cs \cdot vf} \cdot \left(\frac{13.5}{S^{\frac{1}{2}}} - 28\, cs^{\frac{1}{2}}\right)$$

wherein cf is the critical filtration time in seconds, cs is the smoke concentration in pounds of carbon black per cubic foot of smoke under filter conditions, vf is the filtration rate in cubic feet per square foot and minute at filter conditions, and S is the surface area in square meters per gram of carbon black measured in accordance with ASTM D 3037-71T, Method A.

5. A process for recovering carbon black from a carbon black-containing gas which comprises passing said carbon black-containing gas through a filter for a filtration phase which is at least as long as a critical filtration time and up to 50 percent longer, said critical filtration time being defined as the filtration phase at which the linearly plotted curve of the initial filter pressure drop versus the filtration phase has an inflection point and represented by ΔP=f(fp), plotted in plane Cartesian coordinates, wherein the filtration phase (fp) is along the abscissa, or X-axis, and the corresponding initial pressure drop (ΔP) is along the ordinate, or Y-axis, said inflection point being at that value of (fp), the filtration phase, wherein in equation 4, $$\left(\frac{\alpha^2 \Delta P}{\alpha(fp)^2}\right)_{P,T,S,Cs,Vf,Vr,Cb,} = 0$$

and at the zero value in equation 4, (cf)=(fp), and further wherein, in equation 4, when (fp) is slightly larger or slightly smaller than the now determined value (cf), the value of equation 4 changes sign (e.g., − to +, or + to −); stopping the flow of said carbon black-containing gas, wherein the filtration phase is the time of flow of carbon black-containing gas through the filter between two subsequent steps of emptying the filter, passing a backflow gas in a direction opposite to the flow of the carbon black-containing gas through said filter for a period of time not less than the minimum backflow phase defined by the following formula $$cb = 4.5/vr$$

wherein cb is the minimum backflow phase in seconds and vr is the filtration rate in cubic feet per square foot and minutes, thus removing carbon black from said filter and transferring said carbon black to a collection point, stopping the flow of backflow gas and repeating said cycles.

6. A process for recovering carbon black from a carbon black-containing gas comprising passing said carbon black-containing gas through a polytetrafluoroethyene filter for a filtration phase which is at least as long as a critical filtration time and up to 50 percent longer, said critical filtration time being defined as the critical filtration phase at which a linearly plotted curve of the initial pressure drop versus the filtration phase has an inflection point represented by the following formula $$cf = \frac{1}{cs \cdot vf} \cdot \left(\frac{28.6}{S} + 0.9\, cs\right)$$

ps wherein cf is the critical filtration time in seconds, cs is the smoke concentration in pounds of carbon black per cubic foot of smoke under filter conditions, vf is the filtration rate in cubic feet per square foot and minutes at filter conditions, and S is the surface area in square meters per gram of carbon black measured in accordance with ASTM D 3037-71T, Method A, wherein the filtration phase is the time of flow of carbon black-containing gas through the filter between two subsequent steps of emptying the filter stopping the flow of said carbon black-containing gas, passing a backflow gas in a direction opposite to the flow of the carbon black-containing gas through said filter for a backflow phase, thus removing carbon black from said filter and transferring said carbon black to a collection point, stopping the flow of backflow gas and repeating the cycle.

* * * * *